June 3, 1930.    J. N. DUGAN    1,761,073
GEAR LOCK FOR AUTOMOBILES
Filed July 16, 1928
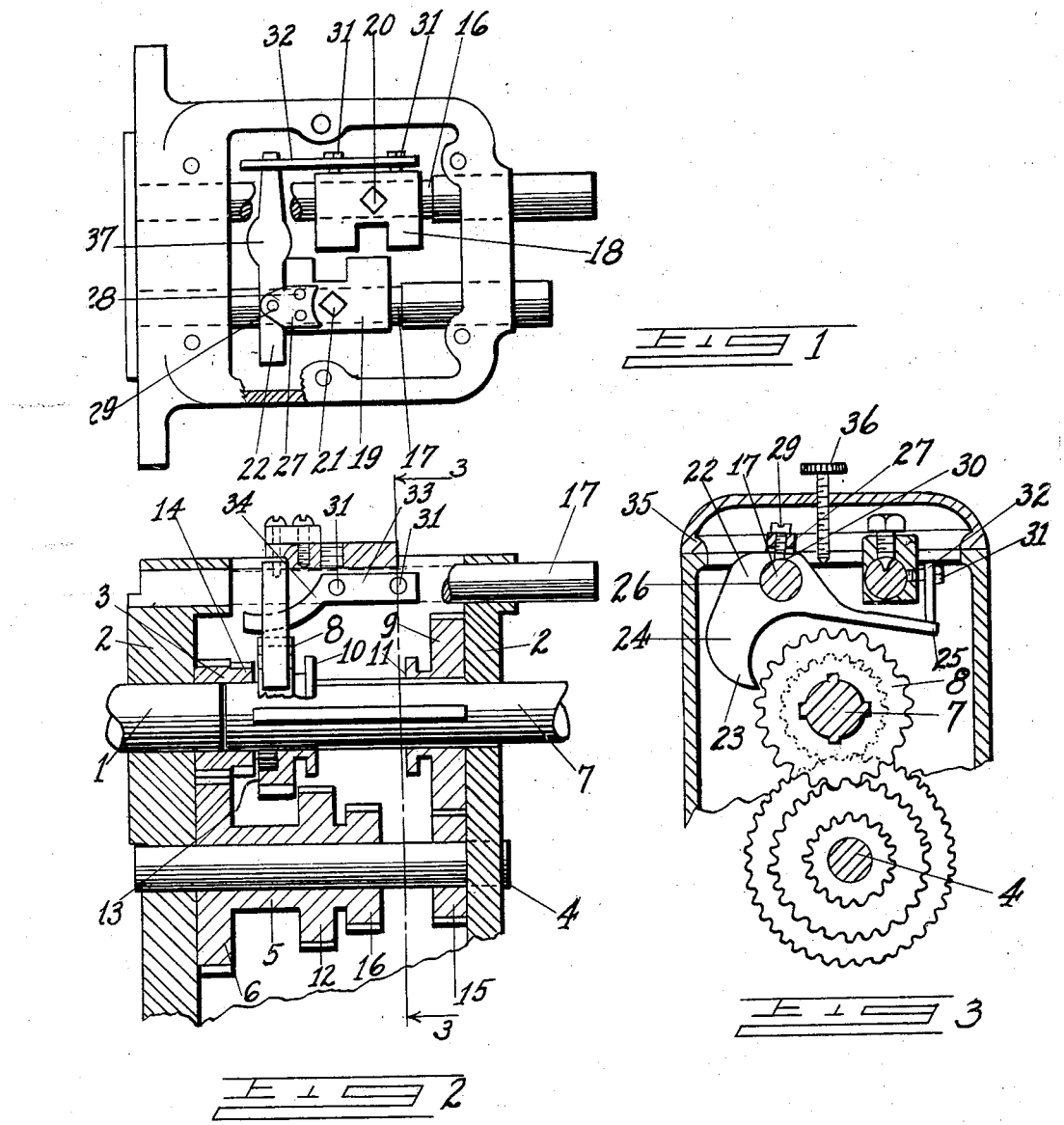

Patented June 3, 1930

1,761,073

UNITED STATES PATENT OFFICE

JAMES N. DUGAN, OF TERRACE PARK, OHIO

GEAR LOCK FOR AUTOMOBILES

Application filed July 16, 1928. Serial No. 293,194.

My invention relates to devices for facilitating and making safer the operation of motor vehicles which have been brought to a stand still on an up-grade.

It will be readily understood that the added difficulties connected with holding and operating a motor vehicle upon an up-grade, spring primarily from the tendency of the vehicle to roll backward down the grade. Thus during a temporary stop, the operator is put either to the physical effort of holding the car against retrogression by means of the foot brake, or he must apply the emergency brake, in which case the operation of starting again is complicated by an added movement. In starting a car on an upgrade while the engine is running, the clutch must be engaged, the car held with the foot brake while the emergency is released, and then started. To do this the operator must quickly transfer his foot from the brake pedal to the accelerator. During the interval of transference, the car is not held and it begins to slide backward. If the operation is carried on dexterously, and the upgrade is not too steep, the car will not have attained any considerable reverse movement; but there are situations in which no reverse movement at all is permissible by reason of the proximity of other vehicles. Again, even where the vehicle is in a position to slide backwards to some extent without danger, any reverse movement puts a greater strain upon the starting torque and is a frequent cause of stalling upon grades. In any event, starting up a vehicle upon an upgrade is one of the chief terrors of the inexperienced driver and a frequent source of disaster. To start a stalled engine on the hillside requires such an interval of time for the depressing of the starting lever, that the emergency must be used and this again complicates the situation.

It has been recognized that if there were some means of holding a car from retrograde movement upon an upgrade road, which means would not impede the forward motion of the car, and which would be releasable when desired, as when a reverse movement was necessary, the problem of upgrade starting would be greatly simplified and rendered much safer. Accordingly there have been proposals involving the application of ratchets and pawls or the like devices to some part of the mechanism attached to the rear wheels, and there have been proposals to provide means for releasing the engagement of the pawls and ratchets when necessary. Such means have however, been separately operable as by means of a lever and they have not been of great assistance. Unless manually engaged, they have not been operative, and the manual engagement of them has been quite as difficult as the engagement of an emergency brake and has merely constituted one more thing for a distracted driver to have to keep in mind. The only advantage which they offered over an ordinary emergency brake was perhaps that the car might be started forward without disengaging them, and the actual disengagement might occur later when the operator had time to think about it.

It is an object of my invention to provide a means, independent of the brakes whereby a motor vehicle stopped on an upgrade may be prevented from sliding backwards down hill, and whereby, particularly, heavy trucks may be safely held in spite of a possible failure of the brakes.

It is an object of my invention to provide such a mechanism which shall be entirely automatic in its operation and which does not require any thought or attention on the part of the operator.

It is still a further object of my invention to provide a reversing lock which shall be continuously in engagement with the members driving the rear system when the car is in neutral, low or second, and which is disengaged only when the car is in reverse or in high.

It is still a further object of my invention to provide a construction readily adaptable to present day transmissions without modification in their construction so that it will not be necessary to build a new transmission to contain my device.

It is still a further object of my invention to place all of the moving parts of my device within the transmission housing where they will be lubricated by the grease therein and where they will require no extra attention whatever.

It is still a further object of my invention to provide a simple and an inexpensive construction which will not add materially to the cost of the vehicle and which can at negligible expense be installed upon vehicles that are now in operation.

These and other objects of my invention which will be apparent to one skilled in the art who reads these specifications, I accomplish by that construction and arrangement of parts of which I shall now describe a preferred embodiment, it being understood that other embodiments are within the power of one skilled in the art to produce without departing from the spirit of my invention. Reference is hereby made to the drawings accompanying this specification.

In the drawings:

Figure 1 is a vertical elevation of a transmission with the cover removed from the housing. It shows the shifting rods and my pawl and the operating means therefor in place. A representation of other parts has been omitted for simplification.

Figure 2 is a vertical section through a transmission showing the operation of my device. Here also some of the parts of the transmission proper have been removed for simplification.

Figure 3 is a transverse section through a transmission along the lines 3—3 in Figure 2. Again various parts of the transmission proper have been removed for simplification. My invention does not make any change in the arrangement or operation of the component parts of a transmission as such. Transmissions being old and well understood, I have included in the drawings accompanying this specificaton only such parts thereof as are necessary to a clear understanding of my invention.

Referring now to Figure 2, I have shown a shaft 1 which connects the transmission with the engine and which supplies motive power. The shaft 1 is of course, journalled in the transmission housing which I have indicated generally as 2. Upon the shaft 1 there is a gear 3 for the transmission of power. A stationary shaft 4 bears a series of gears indicated generally as 5, of which one designated by the numeral 6 is at all times in positive engagement with the gear 3. The gear system 5 rotates as a unit upon the stationary shaft 4.

A shaft 7 also journalled in the transmission housing and aligned though disconnected with shaft 1, carries the power to the elements connected with the drive of the rear wheels as will be well understood. This shaft carries gear members 8 and 9 which are keyed to the shaft but are slidable there along so that they may be moved into or out of engagement with other gears in the system for the purpose of changing the direction of the motion of the shaft 7, or its speed. The movement of the gears 8 and 9 is accomplished by fingers not shown which enter grooves connected with these gears and defined by flanges 10 and 11. This construction and operation will be readily understood. The gear 8 which I shall hereinafter refer to as the "direct drive" gear if moved to the right in Figure 2 may be brought into engagement with the gear 12 which is a part of the gear system 5 and is positively driven by the gear 3 on shaft 1. When 8 is so engaged it will be clear that the shaft 7 will be driven. This engagement just described corresponds with what is known as "second" on a car. The direct drive gear 8 is hollowed out internally to form teeth as shown at 13 adapted for engagement with a portion of the gear 3 designated as 14. Thus when the gear 8 is moved to the left, it is brought out of engagement with the gear 12 and into engagement with the portion 14 of the gear 3 whereupon the shafts 1 and 7 are placed in positive engagement.

The gear 9 also, as explained, slidably keyed to the shaft 7, is adapted for engagement when moved as far as possible to the right, with a gear 15. This gear operates also upon the stationary shaft 4; but it is driven by a mechanism not shown in a direction opposite to that of the gear system 5. The means of doing this are well known and I have not thought it necessary to show them. When the gear 9 is engaged as shown, the shaft 7 is being operated in the reverse direction. The gear 8 is not in engagement with any other gear; that is to say, it is in the neutral position. The gear 9 may however, be moved to the left until it engages with the gear 16 which is a part of the system 5, and when this is done, the shaft 7 will be driven forward slowly. Such a position of the gears is what is known as "low".

The fingers not shown which have been spoken of as sliding the gears 8 and 9 through engagement with grooves defined by flanges 10 and 11 are actuated by shift rods 16 and 17 which are clearly shown in Figure 1. These rods bear shoes 18 and 19 fastened to them by bolts 20 and 21. These shoes, as will also be readily understood, are actuated by the gear shift lever which alternately engages each. Each of the shoes is in neutral position while the gear shift lever engages the other one. The shift rod 16 operates the gear 9 while the rod 17 operates the gear 8.

My invention comprises the engagement of a pawl 22 with the direct drive gear 8, in all positions of the clutch excepting reverse and high. In other words, I desire the pawl 22 to engage the gear 8 when the transmission is in low, neutral or second. The gear 8 is, as has been explained, in engagement with the rear system driven shaft 7 so that the action of the pawl, it will be clear, will be to prevent reverse rotation of the shaft 7 in all positions of the transmission excepting high and reverse.

To accomplish these objects, I prefer to make use of the construction which I shall now describe, although other constructions are possible. I provide a pawl 22 with an engagement portion 23, a head 24, and a releasing arm 25. The head is heavy enough so that the pawl engages with the gear 8 by gravity so long as the arm 25 is not depressed. I prefer to mount the pawl upon the shift rod 17 by perforating it as at 26 to accommodate the rod. When so mounted, the pawl will fall into engagement with the gear 8, and I provide a means for moving the pawl with the shift rod 17 and consequently with the gear 8 so that it will not be brought out of engagement therewith when the gear is shifted along the shaft 7. I have shown for this purpose a bracket 27 which is affixed to the shoe 19 by bolts 28 and has a portion which overlies the top of the pawl. This portion is fitted with a bolt 29 entering an enlarged hole 30 in the top of the pawl. This bolt serves to move the pawl longitudinally with the shift rod without hindering its rocking motion. Other means of accomplishing the same result however, are possible, and I do not desire to be restricted to the specific means shown. I might for example, place a collar next the pawl so as to confine it between this collar and the shoe 19. Or I might attach to the shoe 19 or the shaft 17 other means for moving the pawl therewith.

Means must now be provided for bringing the pawl out of engagement with the direct drive gear 8 in two positions of the transmission, namely; reverse and high. To do this, I provide a releasing mechanism to be attached to the shoe 18 by means of bolts 31 and extending longitudinally of the shaft 16. I have designated this means broadly as 32 in Figures 1 and 3. Figure 2 will show that it comprises an attachment portion 33 and a depending finger 34. It will be understood that the release mechanism moves with the shaft 16 and that when the finger 34 engages the arm 25 thereby depressing it, the pawl 22 is thrown out of engagement with the gear 8.

The operation of my mechanism is as follows:

In the drawings the transmission is shown as in the reverse position. The shoe 19, the shaft 17 and the direct drive gear 8 are in neutral. The shaft 16, the shoe 18 and the release device 32 have been drawn to the right. Therefore the gear 9 has been brought into engagement with gear 15 thereby driving the shaft 7 in the reverse direction; and the finger 34 has been drawn to the right so as to depress the arm 25 and bring the pawl out of engagement with the gear 8 as is shown in Figure 3.

When the car is placed in neutral, the rod 16 and shoe 18 are drawn to the left until the two shoes are in alignment. The gear 9 is brought out of engagement with the gear 15 and now lies opposite the space between the gears 15 and 16. The finger 34 has been moved to the left so that it is now out of engagement with the arm 25 and the pawl 22 is in engagement with the gear 8.

Shifting now to low, the rod 16 is moved still further to the left bringing the gear 9 into engagement with gear 16. The finger 34 being still further moved to the left remains out of engagement with the arm 25 and the pawl is still operative.

Shifting now to second, the rod 16 is brought back to neutral and rod 17 is shifted to the right. This brings gear 8 into engagement with gear 12 and shaft 7 is positively driven forward. The finger 34 is still too far to the left to engage the arm 25 and the pawl is operative.

Shifting now to high, rod 16 remains in the neutral position and rod 17 is shifted as far as possible to the left. The direct drive gear 8 is thereby brought into engagement with the portion 14 of the gear 3 on the main driven shaft and the shaft 7 therefore is rotated positively forward. Rod 16 remains in the neutral position; but this time the pawl 22 moving to the left with the rod 17, has moved so far in that direction that the arm 25 engages the finger 34 and the pawl is lifted out of engagement with the gear 8.

Under certain circumstances, I may desire to provide a device whereby the pawl may be held permanently out of engagement with the gear 8 irrespective of the operation of the clutch. To do this I may thread the cover 35 of the transmission housing to accommodate a thumb screw 36 adapted to bear upon the pawl and hold it out of engagement with the gear. Since the pawl shifts laterally a distance greater than its normal width, I may enlarge a portion of the pawl to form a bearing surface 37 (Figure 1) for the end of the thumb screw 36 in whatever position the pawl may assume.

My invention is characterized by what is in effect a ratchet reverse stop operating upon a shaft which is at all times in positive connection with the rear wheels, the engagement being automatically controlled and effective in all positions except reverse and high. It is characterized by extreme simplicity of construction and operation and by the fact that its attachment is applicable to existing transmission constructions. With my device the difficulties of operating a motor vehicle on an upgrade are done away with. When a vehicle has been stopped on an upgrade and shifted out of high into neutral, it will hold itself against backward movement and does not need to be braced. It will similarly hold itself if shifted into low or second but of course here, in order to prevent forward movement, the operator must keep his foot upon the clutch pedal when he has shifted to low or second; in order to start up again, the operator may take his foot from the brake pedal without fear that the car will start down hill and without the necessity of jumping from the brake to the accelerator or the starter before the car has attained a retrograde momentum. It simplifies operations instead of complicating them and removes from the inexperienced driver, the chief worriment connected with the operation of the car, namely, the holding and starting of it upon an upgrade.

Having thus described my invention, what I claim as new and desire to secure by Letters Patent, is:—

1. In a transmission for motor vehicles, a pawl in operative engagement with a shifting gear upon the driven shaft, and means for releasing said engagement.

2. In a transmission for motor vehicles, a pawl in operative engagement with a shifting gear upon the driven shaft, and means operated by a gear shifting device to release said engagement.

3. In a transmission for motor vehicles, a pawl in operative engagement with a shifting gear on the rear axle drive shaft and automatic means to disengage said pawl when said transmission is in reverse and high.

4. In a transmission for motor vehicles a pawl for engagement with a shifting gear upon the driven shaft, means for shifting said gear, and means operated by said first mentioned means for shifting said pawl with said gear.

5. In a transmission for motor vehicles, a reverse-stop device for engagement with a shifting gear, and means for shifting said device with said gear.

6. In a transmission for motor vehicles, a reverse-stop device for engagement with a shifting member upon the driven shaft, means for shifting said device with said member, and means for disengaging said device therefrom.

7. In a transmission for motor vehicles, a reverse-stop device for engagement with a shifting member upon the driven shaft, means for shifting said device with said member, and means for disengaging said device therefrom, said means automatically effecting disengagement in reverse and high.

8. In a transmission for motor vehicles, a shifting gear upon the driven shaft, a pawl adapted for engagement therewith, shifting means for said transmission, means operable by said first mentioned means to shift said pawl with said gear, and means to effect the disengagement of said pawl from said gear.

9. In a transmission for motor vehicles, a shifting gear upon the driven shaft, a pawl adapted for engagement therewith, shifting means for said transmission, means operable by said first mentioned means to shift said pawl with said gear, and means to effect the disengagement of said pawl from said gear, said last mentioned means operated by said shifting means.

10. In a transmission for motor vehicles, a shifting gear upon the driven shaft, a pawl adapted for engagement therewith, a shift rod and means for shifting said gear, said pawl being mounted upon said rod and shiftable thereby with said gear.

11. In a transmission for motor vehicles, a shifting gear upon the driven shaft, a pawl adapted for engagement therewith, a shift rod and means for shifting said gear, said pawl being mounted upon said rod and shiftable thereby with said gear, a second shift rod and means thereupon for effecting the disengagement of said pawl and said gear.

12. In a transmission for motor vehicles, a high-second or direct drive gear slidably mounted upon a driven shaft, a shift rod and means for shifting said gear, a pawl mounted upon said shift rod, means for shifting said pawl with said gear, a disengagement arm upon said pawl, a second shift rod and shift means for a low-reverse gear, and a disengagement finger for said pawl operatively connected with said second shift means.

13. In a transmission for motor vehicles, a high-second gear slidably mounted upon a driven shaft, a shift rod and means for shifting said gear, a pawl mounted upon said shift rod, means for shifting said pawl with said gear, a disengagement arm upon said pawl, a second shift rod and shift means for a low-reverse gear, and a disengagement finger for said pawl operatively connected with said second shift means, the disposition of said finger and said arm being such that when said first shift means is shifted into the high position said arm will engage said finger, and when said second shift means is moved into reverse position said finger will engage said arm, said finger and arm being out of engagement in all other positions.

14. In a transmission for motor vehicles a high-second gear slidably mounted upon a driven shaft, a shift rod and means including a shoe for shifting said gear, a pawl mounted upon said shift rod for engagement with said gear to prevent reverse rotation thereof, means upon said shoe engaging said pawl to shift it with said shoe, a disengagement arm upon said pawl, a second shift rod and a shoe thereon, and a disengagement finger for said pawl operatively connected with said second shoe.

15. In a transmission for motor vehicles a high-second gear slidably mounted upon a driven shaft, a shift rod and means including a shoe for shifting said gear, a pawl mounted upon said shift rod for engagement with said gear to prevent reverse rotation thereof, means upon said shoe engaging said pawl to shift it with said shoe, a disengagement arm upon said pawl, a second shift rod and a shoe thereon, and a disengagement finger for said pawl operatively connected with said second shoe, the disposition of said finger and said arm being such that when said first shift means is shifted into the high position said arm will engage said finger, and when said second shift means is moved into reverse position said finger will engage said arm, said finger and arm being out of engagement in all other positions.

16. In a transmission for motor vehicles a high-second gear slidably mounted upon a driven shaft, a shift rod and means including a shoe for shifting said gear, a pawl mounted upon said shift rod for engagement with said gear to prevent reverse rotation thereof, means upon said shoe engaging said pawl to shift it with said shoe, a disengagement arm upon said pawl, a second shift rod and a shoe thereon, and a disengagement finger for said pawl operatively connected with said second shoe, the disposition of said finger and said arm being such that when said first shift means is shifted into the high position said arm will engage said finger, and when said second shift means is moved into reverse position said finger will engage said arm, said finger and arm being out of engagement in all other positions, and means for effecting the continuous disengagement of said pawl from said gear.

17. In a transmission for motor vehicles a high-second gear slidably mounted upon a driven shaft, a shift rod and means including a shoe for shifting said gear, a pawl mounted upon said shift rod for engagement with said gear to prevent reverse rotation thereof, means upon said shoe engaging said pawl to shift it with said shoe, a disengagement arm upon said pawl, a second shift rod and a shoe thereon, and a disengagement finger for said pawl operatively connected with said second shoe, the disposition of said finger and said arm being such that when said first shift means is shifted into the high position said arm will engage said finger, and when said second shift means is moved into reverse position said finger will engage said arm, said finger and arm being out of engagement in all other positions, and means for effecting the continuous disengagement of said pawl from said gear, said means comprising a thumb screw operable through the cover of said transmission upon said arm.

JAMES N. DUGAN.